(12) United States Patent
Mambretti et al.

(10) Patent No.: US 12,462,117 B2
(45) Date of Patent: Nov. 4, 2025

(54) METHOD FOR RECORDING MACHINING INFORMATION ASSOCIATED WITH INSULATING PANELS MANUFACTURED IN A CONTINUOUS MACHINING LINE AND RELATIVE SYSTEM

(71) Applicant: SAIP SURL, Inverigo (IT)

(72) Inventors: Michele Mambretti, Inverigo (IT); Klaus Roland Rast, Inverigo (IT); Davide Scoglietti, Inverigo (IT)

(73) Assignee: SAIP SURL, Como (IT)

( * ) Notice: Subject to any disclaimer, the term of this patent is extended or adjusted under 35 U.S.C. 154(b) by 309 days.

(21) Appl. No.: 18/002,038

(22) PCT Filed: Mar. 14, 2022

(86) PCT No.: PCT/IB2022/052273
§ 371 (c)(1),
(2) Date: Dec. 15, 2022

(87) PCT Pub. No.: WO2022/195449
PCT Pub. Date: Sep. 22, 2022

(65) Prior Publication Data
US 2023/0244882 A1    Aug. 3, 2023

(30) Foreign Application Priority Data
Mar. 16, 2021   (IT) .................. 102021000006209

(51) Int. Cl.
*G06K 1/12*     (2006.01)
*G06K 1/05*     (2006.01)
*G06K 13/28*    (2006.01)

(52) U.S. Cl.
CPC .............. *G06K 1/121* (2013.01); *G06K 1/05* (2013.01); *G06K 13/28* (2013.01)

(58) Field of Classification Search
CPC .......... G06K 1/121; G06K 1/05; G06K 13/28
See application file for complete search history.

(56) References Cited

U.S. PATENT DOCUMENTS 8,936,194 B1     1/2015  Welch et al.
10,970,731 B1 *  4/2021  Latifi .................. G06Q 30/0236
(Continued)

FOREIGN PATENT DOCUMENTS

CN      109968700 A       7/2019
DE    102013004332 A1     9/2014
(Continued)

OTHER PUBLICATIONS

WO 2014-139705 Translation (Year: 2014).*
International Search Report and Written Opinion for PCT/IB2022/052273 (Jun. 13, 2022).

*Primary Examiner* — David H Banh
(74) *Attorney, Agent, or Firm* — Merchant & Gould P.C.

(57) ABSTRACT

A method and a system records machining information associated with insulating panels manufactured in a continuous machining line. Machining units carry out machining operations on a panel body moved along the line, between an inlet and an outlet, from a start-production unit at the line inlet. The insulating panels are manufactured by making predetermined cuts in the panel body, at the line outlet. Each machining unit is controlled by a respective electronic control unit. The method generates and prints unique graphic representation identification codes, or Data Matrix codes. A panel body portion to be machined is identified. The Data Matrix codes printed on the panel body to be machined are identified when the panel body portions pass through the machining unit. Machining information is acquired and associated with the detected Data Matrix code. The acquired (Continued)

machining information and associated code are sent to a main processing unit connected.

17 Claims, 5 Drawing Sheets

(56) References Cited

U.S. PATENT DOCUMENTS

2015/0360504 A1* 12/2015 Cappelle ............... B44B 5/0047
 264/40.1
2017/0210147 A1* 7/2017 Lange ....................... G03F 9/00

FOREIGN PATENT DOCUMENTS

EP          0995594   A2    4/2000
WO    WO2014139705   *    9/2014 ............. G06K 19/06

* cited by examiner

METHOD FOR RECORDING MACHINING INFORMATION ASSOCIATED WITH INSULATING PANELS MANUFACTURED IN A CONTINUOUS MACHINING LINE AND RELATIVE SYSTEM

METHOD FOR RECORDING MACHINING INFORMATION ASSOCIATED

This application is a National Stage Application of PCT/IB2022/052273, filed 14 Mar. 2022, which claims benefit of Application No. 102021000006209, filed 16 Mar. 2021 in Italy, and which applications are incorporated herein by reference. To the extent appropriate, a claim of priority is made to each of the above-disclosed applications.

TECHNOLOGICAL BACKGROUND OF THE INVENTION

Field of Application

In general, the present invention relates to automatic systems for producing insulating panels with a continuous machining method. In particular, the invention relates to a method for recording and making accessible machining information associated with insulating panels, or lots of insulating panels, manufactured in a continuous machining line, and it relates to a relative system, which implements such method.

Prior Art

As known, a line or system for the continuous production of insulating panels, in particular, insulating panels of the sandwich type, in which an insulating layer, made of polyurethane foam, is interposed between two metal support layers, comprises a plurality of machining units or sections. In each section of the line, a machining step for machining the panel is carried out by a corresponding machining machine.

With reference to the diagrammatic representation in FIG. 3, a production line 300 of insulating sandwich panels of the known type comprises an unwinding section 301 close to an inlet portion IN of the line. Such unrolling or unwinding section 301 comprises an unwinding machine configured to unwind reels consisting of a continuous wound metal sheet. The aforesaid sheet 30, e.g., made of steel or aluminum, exiting the unwinding section 301, is used to make the metal supports of the sandwich panels 31 between which the insulating layer, made of polyurethane, is interposed, during the successive machining steps. The panels 31, thus manufactured, are made available to an outlet portion OUT of the production plant 300.

In greater detail, the production line of the panels 300 comprises a profiling section 302 adapted to receive the sheet 30, which is unwound in the unwinding section 301. To make a sandwich panel 31 having two metal supports, such profiling section 302 comprises an upper profiling unit and a lower profiling unit.

The upper profiling unit generally includes first machining units configured to form a first metal sheet support of the sandwich panel 31, e.g., the metal sheet support forming the surface of the panel intended to face the outside of the structure, e.g., wall or roof, on which the sandwich panel 31 is installed. Such forming step is carried out, for example, by a roll-forming process known to experts in the field.

The lower profiling unit includes second machining units configured to form a second metal sheet support of the sandwich panel 31 opposite to the first metal sheet support. In other words, such second metal sheet support forms the surface of the panel 31 intended to face towards the inside of the structure on which the sandwich panel is installed. In this case, too, such forming step can be carried out by a known roll-forming process.

Downstream of the profiling section 302, the panel production line 300 comprises a foaming section 303 configured to carry out the dosing and mixing of the polyurethane components, to produce a specific polyurethane foam, which will form the insulating layer of the panels 31. Such foaming section 303 preferably comprises an apparatus for distributing the foam in the liquid step.

Furthermore, at the entrance of the foaming section 303, the panel production line 300 can comprise an element for applying an adhesive (primer) to the second metal sheet support of the sandwich panel 31. Such element acts by dosing, mixing and distributing the adhesive on the second metal sheet support of the panel, to favor the adhesion of the polyurethane foam to the aforesaid second metal sheet support.

Additionally, the panel production line 300 comprises a pressing/cutting section 304, which includes a dual conveyor belt adapted to contain and delimit the continuous panel being formed during the expansion step of the polyurethane foam to ensure the geometric precision of the panel. Additionally, such pressing/cutting section 304 comprises instruments for cutting the panels 31 according to predetermined measurements. Such cutting instruments comprise, for example, a ribbon cutter or a disk cutter.

The cooling of the insulating sandwich panels 31, obtained after the cutting and handling thereof, is comprised at the outlet OUT of the production line 300 for purposes of storage and transport.

One drawback of the process of machining the sandwich panels 31 manufactured with the continuous production line 300 described above, is linked to the fact that nowadays it is impossible to trace the machining data of the single sandwich panel 31 produced, let alone reconstruct the history of the machining operations carried out in order to make the finished product.

As the production process of the sandwich panels is continuous and the production line 300 can even reach a length of about two hundred meters, the need is increasingly felt to develop a solution, which allows realizing a tracing of the machining operations carried out on the produced insulating sandwich panels.

In fact, as in all production processes, being able to trace a product and the machine operations carried out on the product is a desired requirement, both as regards the producer's responsibility and for pursuing a continuous improvement in the quality of the product.

SUMMARY OF THE INVENTION

It is the object of the present invention to conceive and provide a method for recording machining information associated with insulating panels, or lots of insulating panels, manufactured in a continuous machining line which at least partially allows overcoming the limits and drawbacks of the processes of machining the insulating panels manufactured with the continuous production line of the known type, described above.

In particular, the main object of the invention is to provide a method for recording information of machining operations carried out on the insulating panels which allows gathering and collecting the production data of a single product, facilitating the identification of such production data for reconstructing the production history of the panel.

Such object is achieved by a method for recording machining information associated with insulating panels, preferably panels of the sandwich type, manufactured in a continuous machining line.

It is another task of the invention to provide a method, which allows making the recorded machining information associated with the insulating panels easily accessible.

Preferred embodiments of the method for recording machining information associated with insulating panels manufactured in a continuous machining line are described.

A system for recording machining information associated with insulating panels is also the subject of the present invention.

BRIEF DESCRIPTION OF THE DRAWINGS

Further features and advantages of the method and system for recording machining information associated with insulating panels manufactured in a continuous machining line according to the invention will be apparent from the description below of preferred embodiments, given by way of indicative, non-limiting examples, with reference to the accompanying figures, in which:

FIG. 4 shows, using a graphical user interface, a first table representative of machining information associated with a lot of insulating panels manufactured using the system and method in FIGS. 1 and 2;

FIG. 5 shows, using a graphical user interface, a second table representative of machining information associated with a single insulating panel comprised in the lot of panels in FIG. 4.

In the aforesaid figures, equal or similar elements will be indicated by the same reference numerals.

DETAILED DESCRIPTION OF PREFERRED EMBODIMENTS

Figure 1:
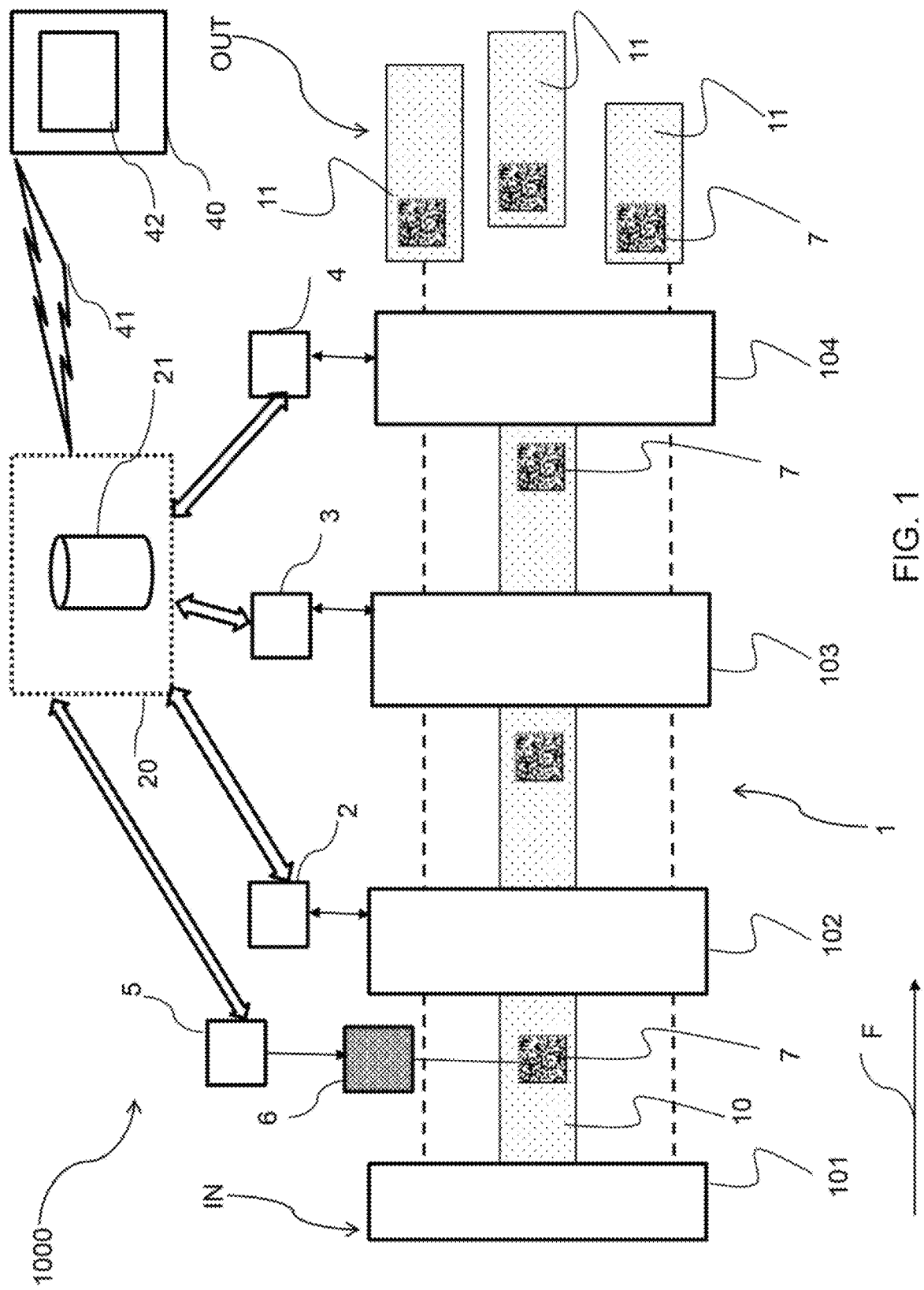
FIG. 1 diagrammatically shows a system, which implements a method according to the invention for recording machining information associated with insulating panels manufactured using a continuous machining line.

With reference to FIG. 1, an example of a system implementing the method for recording machining information associated with insulating panels 11 manufactured in a continuous machining line 1 according to the invention, is globally denoted with reference numeral 1000.

Such insulating panels 11 are preferably sandwich-type panels, each comprising an insulating layer made of polyurethane foam interposed between two metal support layers, e.g., made of steel or aluminum. However, the solutions suggested with the present invention can also be used for manufacturing insulating sandwich panels with non-metal supports (e.g., paper, carton-felt and similar) and for manufacturing insulating panels of a different type.

With reference to FIG. 1, system 1000 comprises the aforesaid continuous machining system or line 1 for manufacturing the panels 11. Such line 1 operates continuously, i.e., it is an automated operating system. In the aforesaid FIG. 1, the machining system or line 1 is diagrammatically depicted in a view from above.

The machining line 1 comprises one or more machining sections or units 102, 103, 104 adapted to carry out machining operations on a panel body 10 moved along a machining direction between an inlet IN and an outlet OUT of the continuous machining line 1. Such machining direction is shown in FIG. 1 with the arrow F. In the example in FIG. 1, the machining line 1 comprises a first 102, a second 103 and a third 104 machining unit.

Such machining line 1 further comprises a start-production unit 101 close to an inlet IN of the machining line 1 for feeding the aforesaid panel body 10 onto the machining line 1.

In a preferred embodiment, the aforesaid start-production unit 101 of the sandwich panels 11 is an unwinding unit 101, comprising an unwinding machine configured to unwind reels consisting of a continuous sheet of wound metal sheet. The aforesaid metal sheet, e.g., made of steel or aluminum, exiting the unwinding unit 101, is used to start the formation of the panel body 10 to be machined on the line 1. Such metal sheet contributes to making the metal supports of the sandwich panels 11 between which the insulating layer, e.g., made of polyurethane, is interposed, during the successive machining steps. Note that the insulating sandwich-type panels 11 mentioned above are manufactured by making cuts in the panel body 10 according to a predetermined measurement, in the outlet portion or outlet OUT of the continuous machining line 1.

The sandwich panels 11 thus manufactured are made available at an outlet portion OUT of the machining line 1.

In a preferred embodiment, the first machining unit 102 of the line 1 is a profiling unit adapted to receive the panel body 10 to be machined, i.e., the metal sheet unwound from the unwinding unit 101. In particular, in order to make a sandwich panel 11 having two metal supports, such profiling unit 102 comprises an upper profiling unit and a lower profiling unit.

The upper profiling unit generally includes first machining units, configured to form a first metal sheet support of the sandwich panel 11. In greater detail, such forming step is carried out, for example, by a roll-forming process, known to experts in the field.

The lower profiling unit includes second machining units, configured to form a second metal sheet support of the sandwich panel 11 opposite to the first metal sheet support. In this case, too, such forming step can be carried out by a known roll-forming process.

In a preferred embodiment, the second machining unit 103 of the line 1 is a foaming unit configured to carry out the dosing and mixing of the polyurethane components, to produce a specific polyurethane foam, which will form the insulating layer of the panels 11. Such foaming unit 103 preferably comprises apparatus for distributing the foam in the liquid phase.

Furthermore, at the inlet of the foaming unit 103, the panel machining line 1 can comprise an element for applying an adhesive (primer) to the second metal sheet support of the sandwich panel 11. Such element acts by dosing, mixing and distributing such adhesive on the second metal sheet support of the panel, to favor the adhesion of the polyurethane foam to the aforesaid second metal sheet support.

In a preferred embodiment, the third machining unit of the line 1 is a pressing/cutting unit 104, which includes a dual conveyor belt adapted to contain and delimit the panel body 10 during the expansion step of the polyurethane foam to ensure the geometric precision of the panel. Additionally, such pressing/cutting unit 104 comprises instruments for cutting the panels 11 according to a predetermined measurement, e.g., a ribbon cutter or a disk cutter.

Again, with reference to FIG. 1, the machining line 1 comprises one or more electronic control units 2, 3, 4 each configured to control the machining operations carried out by one of the aforesaid one or more machining units, i.e., by the profiling unit 102, by the foaming unit 103, by the pressing/cutting unit 104, respectively. With reference to the example in FIG. 1, the machining line 1 comprises a first 2, a second 3 and a third 4 electronic control unit.

Furthermore, the system 1000 comprises a further first electronic control unit 5 configured to generate a plurality of unique graphic representation identification codes 7. Each of such graphic representation identification codes 7, more simply identification codes or codes, is adapted to identify a portion of the panel body 10 to be machined.

In an embodiment, the aforesaid first 2, second 3, third 4 electronic control units and the aforesaid further first electronic control unit 5 comprise a programmable logic controller (PLC).

The system 1000 further comprises a peripheral printing unit 6 controlled by the further first electronic control unit 5 for printing the aforesaid unique graphic representation identification codes 7 on an outer surface of the panel body 10 at the outlet of the start-production unit 101, i.e., at the outlet of the unwinding unit 101, during the continuous manufacturing process.

In an embodiment, the peripheral printing unit 6 comprises an ink jet printer or a laser printer.

Note that each unique identification code 7 is printed on the portion of the panel body 10 to be machined, which is identified thereby and at a predetermined distance from the successive identification code 7 of the plurality of codes generated.

In greater detail, the further first electronic control unit 5 is configured to control the printing of each unique identification code 7 on the panel body 10 to be machined at a predetermined distance from the successive identification code 7 of the plurality of codes.

In other words, each new unique graphic representation identification code 7 is printed on the portion of the panel body 10 to be machined, which is identified thereby after the panel body 10 has been moved by a predetermined distance, so that the new identification code 7 and the previously printed identification code are separated from each other by such predetermined distance.

Such predetermined distance between codes, for example, by one meter, is defined on the basis of a length measurement of said panel body 10 provided by an encoder device operatively associated with the further first electronic control unit 5.

In an embodiment, the aforesaid unique graphic representation identification codes 7 are Data Matrix-type unique two-dimensional codes.

As known, the Data Matrix is a two-dimensional matrix bar code, consisting of black and white cells arranged inside a rectangular or square diagram.

In a further embodiment, the aforesaid unique graphic representation identification codes 7 are unique two-dimensional codes of the QR-code type.

Note that, in general, the system 1000 and method of the invention can be set to operate both with Data Matrix-type codes and QR-codes.

In particular, the aforesaid unique Data Matrix codes 7 comprise identification data of a panel body 10 portion to be machined and machining startup time or chronological data of said panel body 10 portion.

Even more specifically, the identification data of a portion of the panel body 10 to be machined of the unique Data Matrix codes 7 comprise a measurement of the metal sheet length forming the panel body 10 fed from the start-production unit 101 at the inlet IN of the machining line 1. The machining startup time or chronological data of the panel body (10) portion comprises the start time and date of the machining. For example, the information contained in a generated Data Matrix code can be represented with the following identification string "45_16:59:08-06/07/2020" consisting of the meter number of the unwound metal sheet (45), the start-production time (16:59:08) and the production date, to make the single production meter unique.

In an embodiment, the aforesaid metal sheet length can be modified, for example, manually by the operator at the start of the machining of each new panel body 10 fed from the unwinding unit 101 of the continuous machining line 1.

Additionally, the system 1000 comprises a main processing unit 20 connected with at least one of the aforesaid first 2, second 3 and third 4 electronic control units. In the example in FIG. 1, the main processing unit 20 is connected, to exchange data and instructions, with all the electronic control units 2, 3, 4 each of which controls the machining operations carried out by one of the machining units, 102, 103, 104 mentioned above.

Furthermore, the main processing unit 20 is also connected, to exchange data and instructions, with the further first electronic control unit 5, which controls the printer 6.

Such main processing unit 20, which is a server operating according to an FTP data transfer protocol FTP (File Transfer Protocol), comprises a processing unit (Central Processing Unit or CPU) and a memory 21 for storing data.

In a general embodiment, at least one of the aforesaid electronic control units 2, 3, 4 of the system 1000 comprises means for detecting the unique graphic representation identification code 7, identifying the panel body 10 portion to be machined and means for acquiring information of machining operations carried out on the panel body 10 portion identified by the detected unique graphic representation identification code 7.

In greater detail, the means for detecting the unique graphic representation identification code 7 identifying the portion of the panel body 10 to be machined, comprise a code reading device connected with the PLC of the at least one of the aforesaid first 2, second 3 and third 4 electronic control units 2.

Furthermore, the means for acquiring information of machining operations carried out on the portion of the panel body 10 identified by the detected unique graphic representation identification code 7 comprise sensors. Such sensors are operatively associated with the PLC, which control the profiling unit 102, the foaming/primer unit 103 and the pressing/cutting unit 104. Such sensors comprise, for example: one or more temperature sensors, one or more pressure sensors, one or more capacity sensors, one or more density sensors, a video camera (smart camera).

For example, the information of machining operations carried out on the panel body 10 portion comprises data on the machining operations carried out, machining parameters, images of the panel body 10 portion.

In a general embodiment, at least one of the first 2, second 3, third 4 electronic control unit of the system 1000 further comprises means for associating the acquired machining information with the detected unique graphic representation identification code 7, and means for sending such machining information and the unique identification code 7 associated therewith to the main processing unit 20 to be stored in the memory 21.

In particular, the system 1000 comprises means for associating, with each insulating panel 11 manufactured at the outlet OUT of the continuous machining line 1, a unique identification number ID of the panel configured to encode, with a numerical string, one or more graphic representation identification codes 7 associated with said insulating panel 11, and means for sending said unique identification number ID of the panel to the aforesaid main processing unit 20 to be stored in such memory 21.

Furthermore, the system 1000 comprises a portable electronic device 40 provided with wireless communication means 41 and display interface means 42, e.g., a display. Such portable electronic device 40, e.g., a smart phone, a tablet or a laptop, is configured to establish a remote wireless communication with the main processing unit 20 through a telematic communication network, e.g., the Internet network.

Figure 2:
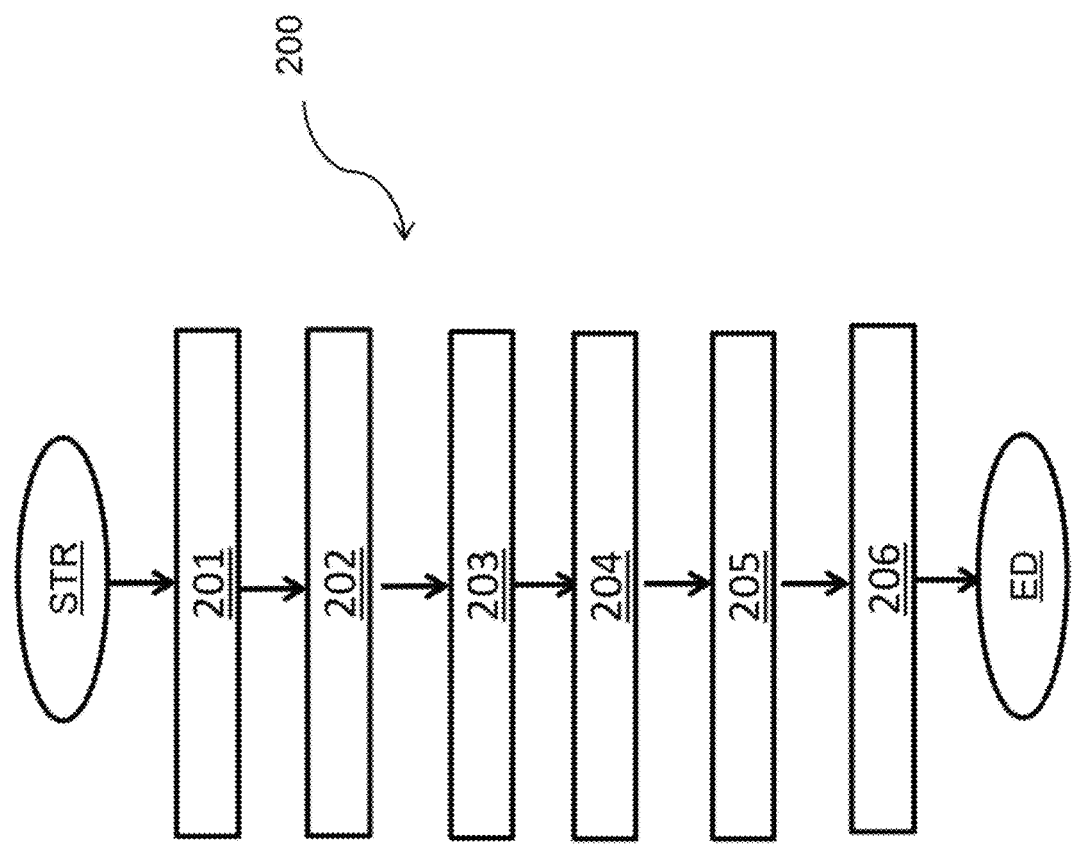
FIG. 2 shows, using a flow diagram, the method of the invention for recording machining information associated with insulating panels manufactured with the system in FIG. 1.
Figure 3:
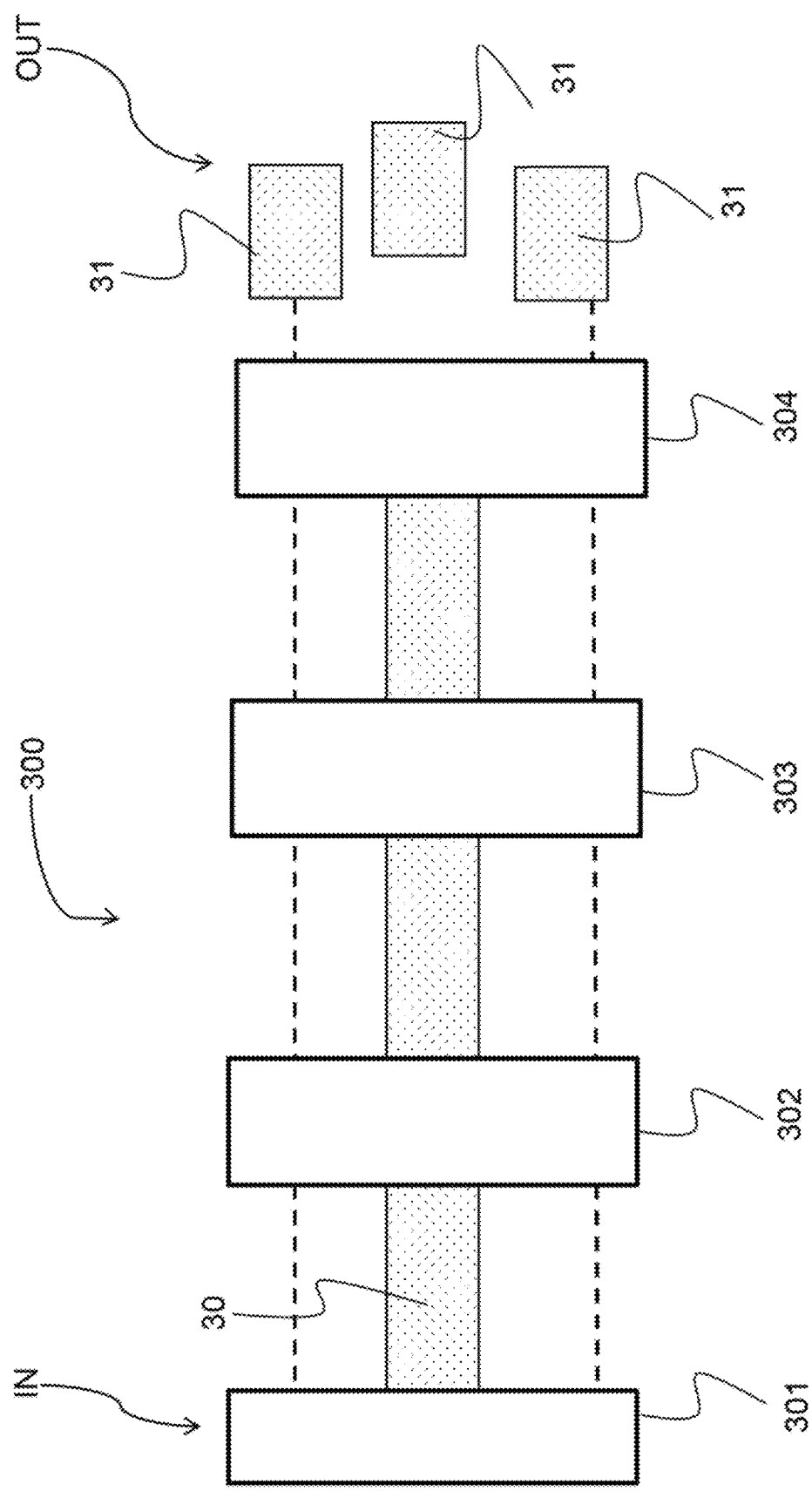
FIG. 3 diagrammatically shows a production line of insulating sandwich panels of the known type, including a plurality of panel machining sections.

With reference to FIG. 2, the operating steps are described below in greater detail of a method 200 for recording machining information associated with insulating panels 11 manufactured in a continuous machining line 1 implemented through the system 1000.

In an embodiment, the main processing unit 20 of the system 1000 is designed to cooperate with the first 2, second 3, third 4 electroniccontrol unit and with the further first electronic control unit 5 to make the codes of an application program, which implements the method 200 of the present invention.

The method in FIG. 2 starts with a symbolic start step "STR" and ends with a symbolic end step "ED".

In the more general embodiment, the method 200 for recording machining information associated with insulating panels 11 comprises a first generating step 201 of generating, by the further first electronic control unit 5 of the system 1000, a plurality of unique graphic representation identification codes 7, in particular, a plurality of unique Data Matrix codes 7. Each of the identification codes 7 of the plurality identifies a portion of the panel body 10 to be machined.

Furthermore, the method 200 comprises a printing step 202, through the peripheral printing unit 6 controlled by the further first electronic control unit 5, of the unique Data Matrix codes 7 generated on the outer surface of the panel body 10 at the outlet of the start-production unit 101 of the machining line 1. In particular, each unique Data Matrix code 7 is printed on the panel body 10 portion to be machined, which is identified thereby and at a predetermined distance from the successive Data Matrix code 7 of the plurality of codes.

In other words, each new unique graphic representation identification code 7 is printed on the panel body 10 portion to be machined, which is identified thereby after the panel body 10 has been moved by a predetermined distance, so that the new identification code 7 and the previously printed identification code are separated from each other by such predetermined distance.

Successively, the method 200 comprises a detection step 203 of detecting, in succession, by at least one of the first 2, second 3 and third 4 electronic control units, the Data Matrix codes 7 printed on the outer surface of the panel body 10 to be machined, when the body panel 10 portions identified by each of such identification codes pass through the respective at least one first 102, second 103 and third 104, machining unit, controlled by the at least one of the electronic control units 2,3,4, mentioned above.

The method 200 also comprises an acquisition step 204 of acquiring, by the at least one of such electronic control units 2, 3, 4, information of machining operations carried out on the panel body 10 portion, identified by the detected unique identification code 7.

Furthermore, the method 200 comprises an association step 205 of associating such acquired machining information with the detected unique identification code 7.

The method 200 comprises a successive step of sending 206, by the at least one of such electronic control units 2, 3, 4, such machining information and the unique identification code 7 associated therewith to a main processing unit 20 of the system 1000 connected with the at least one electronic control unit 2, 3, 4 to be stored in the memory 21 of such main processing unit 20.

In an embodiment, the step 202 of printing the identification codes or unique Data Matrix codes 7 of the method 200 comprises a step of printing each Data Matrix code on the outer surface of the panel body 10 at a distance of one meter from the successive identification code 7 of the plurality of codes.

In an embodiment, the step 203 of detecting, in succession, the unique identification codes 7 printed on the outer surface of the panel body 10 to be machined, comprises a step of reading such identification codes 7 by a code reading device, in particular, a Data Matrix code reader, connected with the at least one of the aforesaid electronic control units 2, 3, 4. In the example of the invention in FIG. 1, each of the first 2, second 3 and third 4 electronic control units comprises a Data Matrix code reader.

In an advantageous embodiment, with reference to said sending step 206, the method 200 of the invention further comprises the steps of:

associating, with each insulating panel 11 manufactured at the outlet OUT of the continuous machining line 1, a unique identification number ID of the panel configured to encode, with a numerical string, one or more graphic representation identification codes 7 associated with the insulating panel 11;

sending such unique identification number ID of the panel 11 to the main processing unit 20 to be stored in the memory 21.

For example, when the panel body 10 crosses the pressing/cutting unit 104, on cutting the panel 11 the Data Matrix codes read between the penultimate and the last cut are grouped into the unique ID of the sandwich panel 11. The ID is formed by a string of numbers, such as, for example the string 1594049181413 indicated in the tables in FIGS. 4 and 5.

Figure 4:
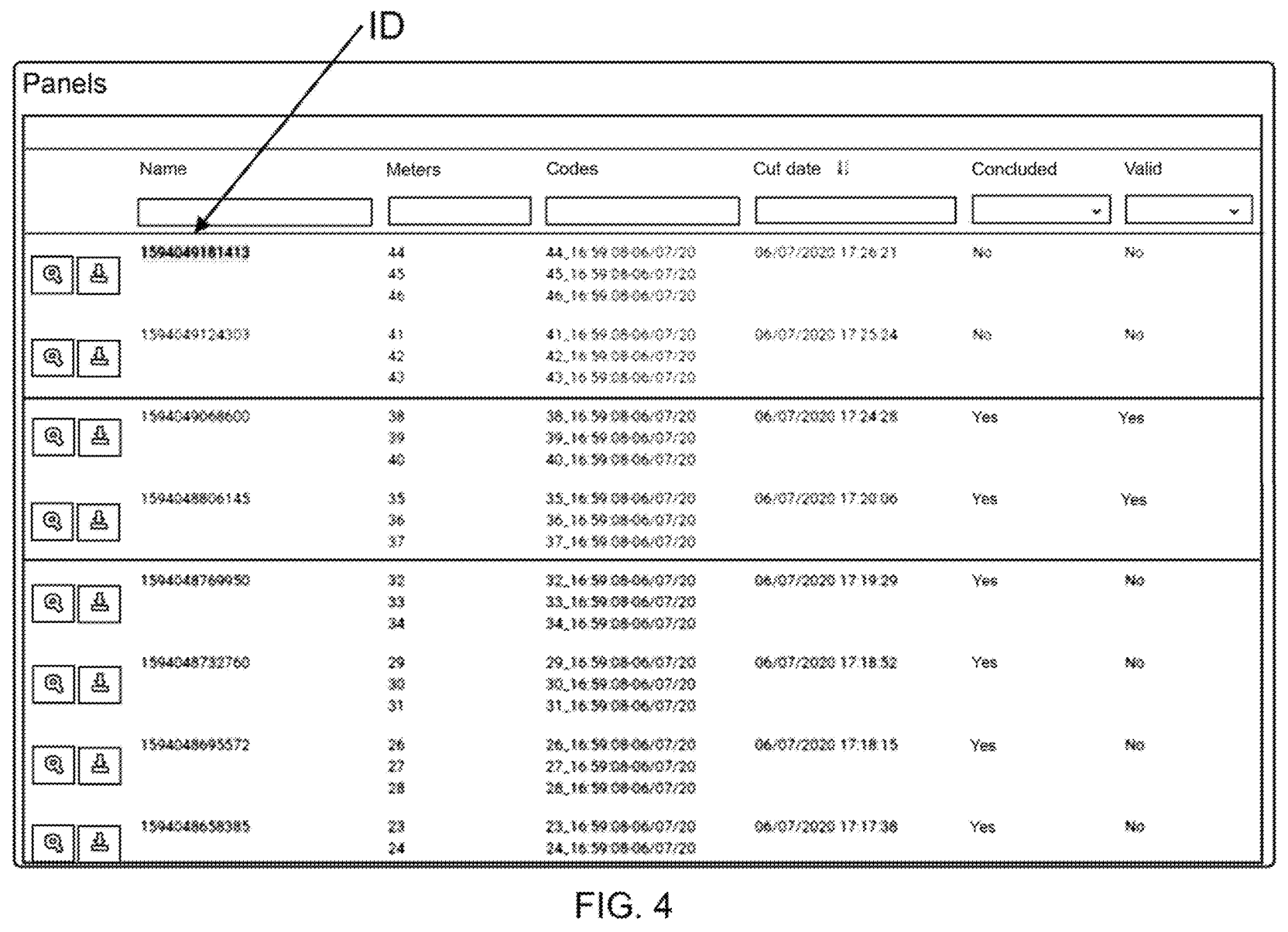

For example, a sandwich panel 11, which is three meters long, includes at least three Data Matrix codes, which are grouped into the unique ID of the sandwich panel, as shown in the first table in FIG. 4, which represents a lot of sandwich panels 11 manufactured with the machining line 1.

In this way, the method of the invention allows gathering and collecting the production data of a single sandwich panel 11, facilitating the identification of such production data for reconstructing the production history of the panel or a successive analysis aimed at improving the production quality.

In a further embodiment, the method 200 of the invention also comprises the steps of:

acquiring a photographic image 50 of each insulating panel 11 manufactured at the outlet OUT of the continuous machining line 1; such photographic image 50 is associated with the unique identification number ID of the respective sandwich panel 11;

sending such photographic image 50 of the insulating panel 11 to the main processing unit 20 to be stored in the memory 21.

In particular, the photographic image is acquired when the panel 11 passes over a photocell. As the Data Matrix code reader of the pressing/cutting unit 104 is before the smart camera, each photographic image acquired is associated with the previous cut.

Figure 5:
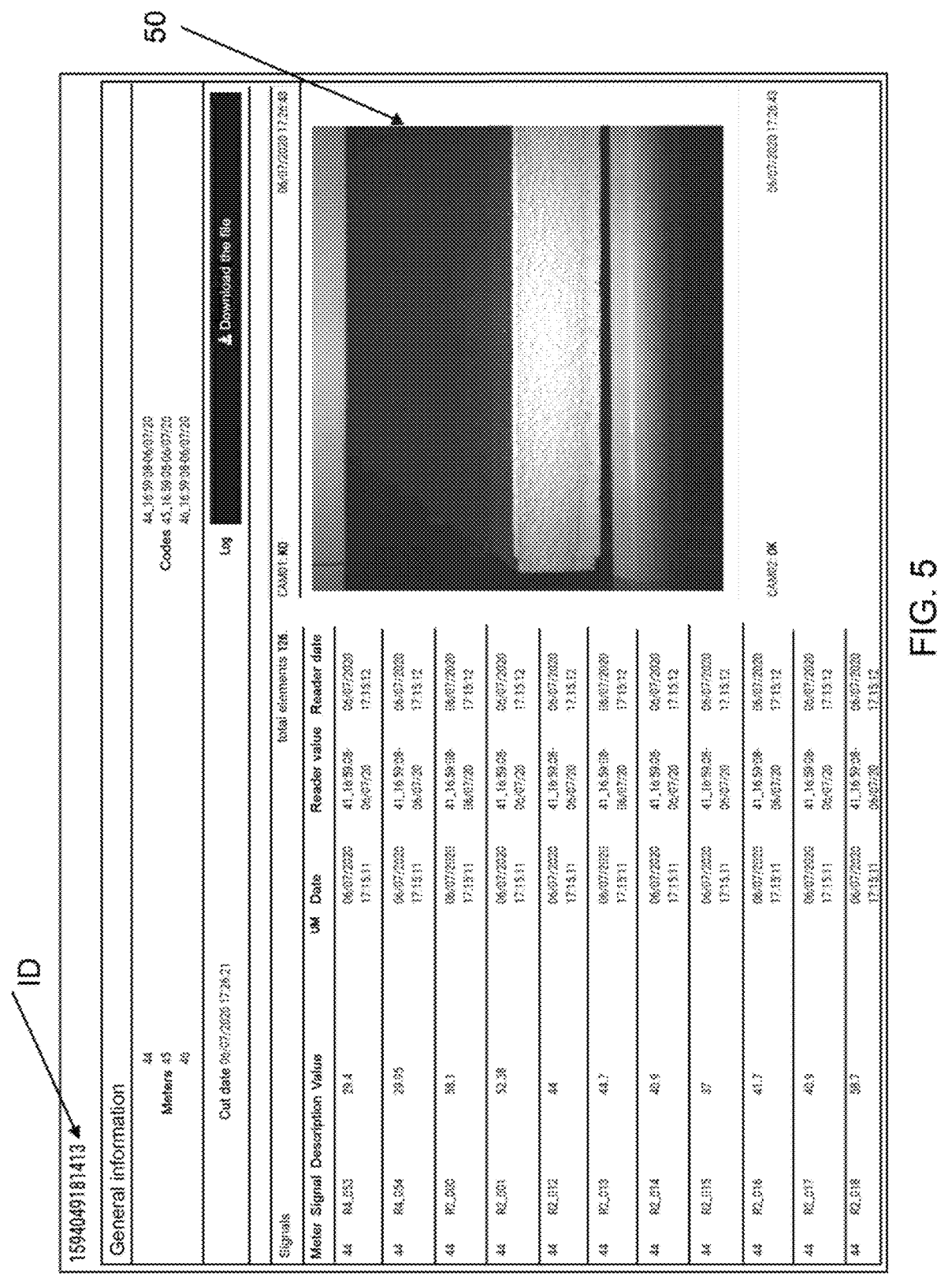

Note that the photographic image 50 associated with the identification number ID is shown together with the machining information of the panel 11, as indicated in the second table in FIG. 5.

Through the acquired photographic images 50, the system 1000 is configured to evaluate, by an appropriate algorithm of the known type, whether the geometry of the panel respects predetermined tolerances.

Furthermore, through such images, an operator is able to analyze the quality of the foam and the presence of gaps in the foam in the cutting area, whether they are in the connection area or also in the central part of the panel 11. Each sandwich panel 11 is classified, on the basis of the result of such analysis, in terms of quality, as a suitable or non-suitable panel.

In a further embodiment, the method 200 of the invention further comprises the use of the portable electronic device 40 described above, provided with wireless communication means 41 and display interface means 42. Such device 40, e.g., a smartphone, a tablet or a laptop, is configured to establish a remote communication in wireless mode with the main processing unit 20 through a telematic communication network, e.g., the Internet network.

In particular, the method 200 comprises the reading, by a code reading device associated with the portable electronic device 40, of one or more of the unique Data Matrix codes 7 associated with an insulating panel 11.

Based on the read Data Matrix code 7 and, for example, predetermined access credentials (login and password), the method allows enabling a secure wireless communication in wireless mode of the portable electronic device 40 with the main processing unit 20. In this way, the machining information associated with the insulating panel 11 recorded in the memory 21 of the FTP server 20 is remotely made accessible to a user provided with the portable electronic device 40. In particular, such machining information, for example, the tables in FIGS. 4 and 5, are displayed on the display 42 of the portable electronic device 40.

In this way, a buyer of the sandwich panel 11 will always be able to trace and verify the data associated with the production of the panel, even a long time after the purchase was made.

The method 200 for recording machining information associated with insulating panels 11 in a continuous machining line of the invention, and relative system 1000, have numerous advantages and achieve the predetermined objects.

In fact, the method of the invention allows gathering and collecting the production data of a single sandwich panel 11, facilitating the identification of such production data for reconstructing the production history of the panel.

Allowing the identification of the production data for the single panel 11, the suggested method 200 represents a useful instrument of analysis in production and enables the production history of the finished product to be easily reconstructed. Therefore, the suggested method allows the quality of the analysis of the production package to be improved, as well as the analysis of the quality of the raw materials used.

Furthermore, the method 200 of the invention allows realizing an accessible computerized support, also remotely, for managing complaints by end customers and for providing customized reports on the machining operations carried out.

Those skilled in the art may make changes and adaptations to the embodiments of the method and system of the invention or can replace elements with others which are functionally equivalent, in order to meet contingent needs without departing from the scope of the following claims. All the features described above as belonging to a possible embodiment may be implemented independently of the other described embodiments.

The invention claimed is:

1. A method for recording machining information associated with insulating panels manufactured in a continuous machining line, said continuous machining line comprising one or more machining units adapted to carry out machining operations on a panel body moved along a machining direction between an inlet and an outlet of the continuous machining line, said panel body being fed from a start-production unit arranged at the inlet of the machining line and said insulating panels being manufactured by making cuts in the panel body, according to a predetermined measurement, at the outlet of the continuous machining line, each of said one or more machining units being controlled by a respective electronic control unit of the machining operations carried out, the method comprising the steps of:

generating, by a first electronic control unit, a plurality of unique graphic representation identification codes, each of the unique graphic representation identification codes of the plurality identifying a portion of the panel body to be machined;

printing, through a peripheral printing unit controlled by the first electronic control unit, said unique graphic representation identification codes on an outer surface of the panel body at the outlet of the start-production unit during the continuous manufacturing process, each new unique graphic representation identification code being printed on the panel body portion to be machined identified thereby after the panel body has been moved by a predetermined distance, so that the new unique graphic representation identification code and the previously printed unique graphic representation identification code are separated from each other by said predetermined distance;

detecting in succession, by at least one of said electronic control units, the unique graphic representation identification codes printed on the outer surface of the panel body to be machined, when the panel body portions identified by each of said unique graphic representation identification codes pass through the at least one machining unit controlled by the at least one of said electronic control units;

acquiring, by the at least one of said electronic control units, information of machining operations carried out on the panel body portion identified by the detected unique graphic representation identification code;

associating said acquired machining information with the detected unique graphic representation identification code;

sending, by the at least one of said electronic control units, said acquired machining information and the unique graphic representation identification code associated therewith to a main processing unit connected with the at least one electronic control unit;

storing said acquired machining information and the unique graphic representation identification code associated with said acquired machining information in a memory of said main processing unit;

storing in said memory of the main processing unit a unique identification number of the insulating panel portion configured to encode, with a numerical string, at least a distance indication of the panel portion relative to an edge of the panel; wherein the unique identification number is associated in the memory with the graphic representation identification codes associated with said insulating panel portion.

2. The method for recording machining information associated with insulating panels according to claim 1, wherein said unique graphic representation identification codes are two-dimensional codes comprising Data Matrix codes or QR-codes.

3. The method for recording machining information associated with insulating panels according to claim 1, wherein said unique graphic representation identification codes comprise identification data of a panel body portion to be machined and machining startup time data of said panel body portion.

4. The method for recording machining information associated with insulating panels according to claim 3, wherein:
the identification data of a panel body portion to be machined comprises a measurement of a length of a metal sheet exiting the start-production unit at the inlet of the machining line forming the panel body,
the machining startup time data of the panel body portion comprises a start time and date of the machining.

5. The method for recording machining information associated with insulating panels according to claim 4, wherein said metal sheet length is modifiable at the startup of the machining of each new panel body fed from the start-production unit of the continuous machining line.

6. The method for recording machining information associated with insulating panels according to claim 1, wherein said printing step of printing said unique graphic representation identification codes comprises a step of printing each unique graphic representation identification code on the outer surface of the panel body at a distance of one meter from the successive unique graphic representation identification code of the plurality of codes.

7. The method for recording processing information associated with insulating panels according to claim 1, wherein said step of detecting, in succession, the unique graphic representation identification codes printed on the outer surface of the panel body to be machined, comprises a step of reading said unique graphic representation identification codes by a code reading device connected with the at least one of said electronic control units.

8. The method for recording machining information associated with insulating panels according to claim 1, wherein the information of machining operations carried out on the panel body portion comprises data on the machining operations carried out, machining parameters, images of the panel body portion.

9. The method for recording machining information associated with insulating panels according to claim 1, further comprising the steps of:
acquiring a photographic image of each insulating panel manufactured at the outlet of the continuous machining line, said photographic image being associated with the unique identification number of the respective panel;
sending said photographic image of the insulating panel to said main processing unit to be stored in said memory.

10. The method for recording machining information associated with insulating panels according to claim 1, further comprising the steps of:
providing a portable electronic device provided with wireless communication means and a display interface, said device being configured to establish a remote wireless communication with the main processing unit through a telematic communication network;
reading, by a code reading device associated with the portable electronic device, one or more of said unique graphic representation identification codes associated with an insulating panel;
enabling, based on the unique graphic representation identification code read and on predetermined access credentials, a secure wireless communication of the portable electronic device with the main processing unit for making the machining information associated with the insulating panel recorded in the memory of the main processing unit remotely accessible.

11. A system for recording machining information associated with insulating panels manufactured in a continuous machining line, comprising:
the continuous machining line which comprises:
one or more machining units adapted to carry out machining operations on a panel body moved along a machining direction between an inlet and an outlet of the continuous machining line,
a start-production unit arranged at the inlet of the machining line for feeding said panel body on the machining line,
said insulating panels being manufactured by making cuts in the panel body, according to a predetermined measurement, at the outlet of the continuous machining line,
one or more electronic control units, each of the one or more electronic control units configured to control the machining operation carried out by one of said one or more machining units;
a first electronic control unit configured to generate a plurality of unique graphic representation identification codes, each of the plurality of unique graphic representation identification codes adapted to identify a panel body portion to be machined;
a peripheral printing unit controlled by the first electronic control unit for printing said unique graphic representation identification codes on an outer surface of the panel body at the outlet of the start-production unit during the continuous manufacturing process, wherein each new unique graphic representation identification code being printed on the panel body portion to be machined, which is identified thereby, after the panel body has been moved by a predetermined distance, so that the new unique graphic representation identification code and the previously printed unique graphic representation identification code are separated from each other by said predetermined distance;

a main processing unit connected with at least one of said electronic control units and comprising a memory for storing data;

at least one of said electronic control units comprising means for detecting the unique graphic representation identification code identifying the panel body portion to be machined and means for acquiring information of the machining operations carried out on the panel body portion identified by the detected unique graphic representation identification code;

the at least one of said electronic control units further comprising, means for associating said acquired machining information with the detected unique graphic representation identification code, means for sending said acquired machining information and the unique graphic representation identification code associated therewith to said main processing unit to be stored in said memory, a unique identification number of the insulating panel portion being stored in said memory of the main processing unit, said unique identification number of the insulating panel portion being configured to encode, with a numerical string, at least a distance indication of the panel portion relative to an edge of the panel;

wherein the unique identification number is associated in the memory with the graphic representation identification codes associated with said insulating panel portion.

12. The system for recording machining information associated with insulating panels according to claim 11, wherein said at least one electronic control unit and said first electronic control unit comprise a programmable logic controller, PLC.

13. The system for recording machining information associated with insulating panels according to claim 11, wherein said main processing unit comprises a server operating in accordance with an FTP data transfer protocol.

14. The system for recording machining information associated with insulating panels according to claim 11, wherein said peripheral printing unit comprises an ink jet printer or a laser printer.

15. The system for recording machining information associated with insulating panels according to claim 11, wherein said first electronic control unit is configured to control the printing of each unique graphic representation identification code on the panel body to be machined at a distance of one meter from the successive unique graphic representation identification code of the plurality of codes based on a measurement of the length of said body provided by an encoder device.

16. The system for recording machining information associated with insulating panels according to claim 11, wherein said means for detecting the unique graphic representation identification code identifying the panel body portion to be machined comprise a code reading device connected with the at least one of said electronic control units.

17. The system for recording machining information associated with insulating panels according to claim 11, further comprising a portable electronic device provided with wireless communication means and a display interface, said portable electronic device being configured to establish a remote wireless communication with the main processing unit through a telematic communication network.

* * * * *